(No Model.)
J. SCHEUERMANN.
STOVE PIPE THIMBLE OR SLEEVE.
No. 327,321. Patented Sept. 29, 1885.
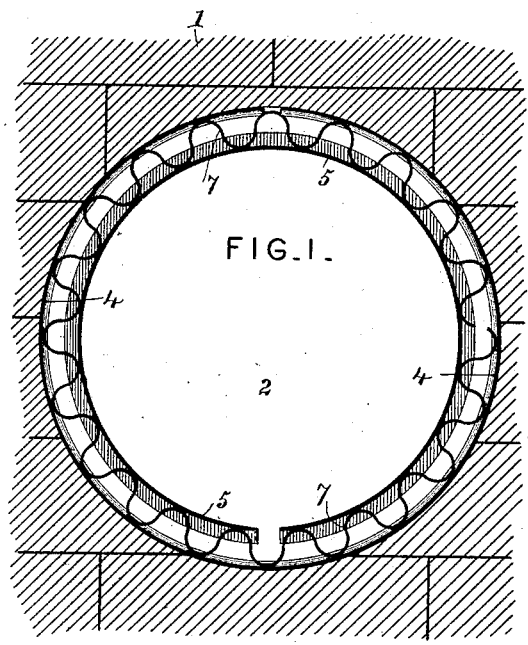
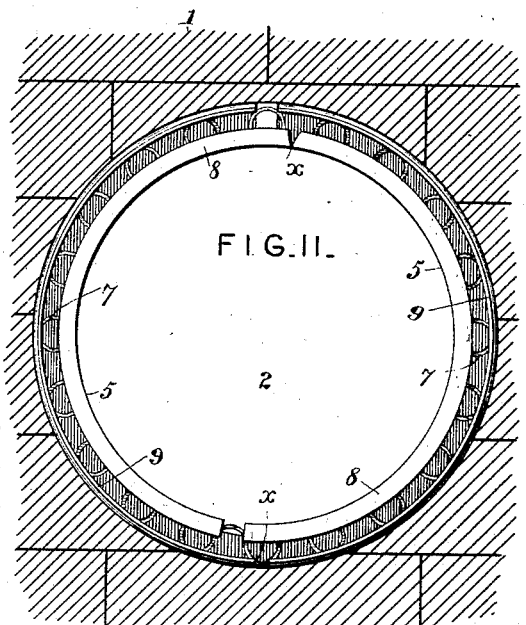
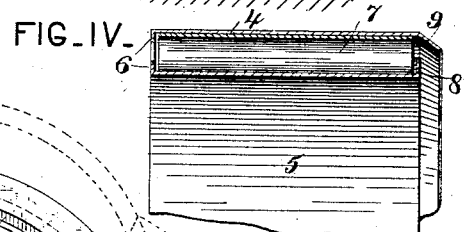
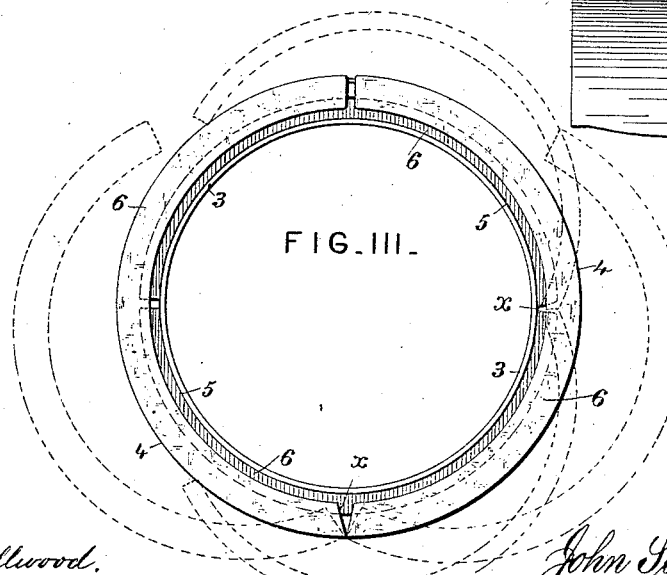
Attest:
Geo. T. Smallwood.
Inventor:
John Scheuermann.
By Knight Bros.
Attys.
N. PETERS, Photo-Lithographer, Washington, D. C.

UNITED STATES PATENT OFFICE.

JOHN SCHEUERMANN, OF CLEVELAND, OHIO.

STOVE-PIPE THIMBLE OR SLEEVE.

SPECIFICATION forming part of Letters Patent No. 327,321, dated September 29, 1885.

Application filed December 10, 1884. (No model.)

*To all whom it may concern:*

Be it known that I, JOHN SCHEUERMANN, a citizen of the United States, residing at Cleveland, in the county of Cuyahoga and State of Ohio, have invented certain new and useful Improvements in Stove-Pipe Thimbles or Sleeves, of which the following is a specification.

The invention relates to a thimble adapted to enter a chimney-hole and fill the space between said hole and a stove-pipe in such a manner as to hold the pipe to position, prevent conduction of heat therefrom to the wall, and prevent back-draft around the pipe.

To this end I provide two coaxial cylindrical rings having upturned flanges at each end, between which is retained a corrugated plate bent to such form as to occupy the annular opening between said rings. The flanges on said rings are made to overlap, so as to prevent any back-draft, while the arrangement is such as to provide free access of air around the pipe to prevent overheating. The flange of the inner end of the thimble is bent over at an angle of about thirty degrees, so as to enable the ready entry of the thimble into the chimney-hole.

In order that my invention may be more fully understood, I will proceed to describe it with reference to the accompanying drawings, in which—

Figure I is a vertical sectional view of my improved thimble in position in a chimney-hole. Fig. II is an end elevation thereof from the inside of the chimney-hole. Fig. III is a detail view showing the manner of securing the thimble to the pipe without removing the end of the latter from the chimney-hole. Fig. IV is a longitudinal section of the thimble.

1 may represent a wall of a chimney having a hole, 2, of greater diameter than the stove-pipe 3, which is to occupy the same. To fill the annular space between the pipe and sides of the hole, I provide a thimble consisting of the coaxial rings 4 5, the outer ends of which are turned over, as shown at 6, so as to overlap, thus preventing any back-draft around the pipe and at the same time hold into the hole the corrugated plate 7, bent into circular form, so as to occupy the annular chamber between said rings. On the inside said corrugated plate is held to position by a similar flange, 8, on the inner ring, while the inner end of the outer ring is made slightly tapering—say, at an angle of thirty degrees—as shown at 9, to permit the ready entry of the thimble into the chimney-hole. The ends of the rings and the corrugated plate are not intended to be fixed together, but to permit slight expansion of the thimble to occupy holes of slightly different dimensions.

The rings may be slipped on over the end of the pipe, or may be sprung open, as represented in Fig. III, and put on at an intermediate point transversely of the pipe, the inner ring, 5, first being applied, then the corrugated plate 7, and then the outer ring, 4, with its tapering flange toward the chimney-hole. The thimble is next grasped by the hands, the corrugated plate being compressed by pressure on the outer ring, and the whole thimble is slid along the pipe into the annular space left in the chimney-hole, where the outer ring is opened outward by the corrugated plate on removing the hands. To permit the latter mode of setting, the flanges of the respective rings 4 and 5 must be cut or notched, as shown at *x* in Fig. III.

Having thus described my invention, the following is what I claim as new therein and desire to secure by Letters Patent—

1. A stove-pipe thimble consisting of two coaxial rings and a corrugated plate bent to circular form and retained by suitable means between said rings, substantially as set forth.

2. In combination with two coaxial rings having upturned flanges, a bent corrugated plate occupying the annular chamber between said rings, substantially as set forth.

3. In combination with two coaxial rings having overlapping flanges at one end, a bent corrugated plate retained between said rings, substantially as set forth.

4. In combination with two coaxial rings, a corrugated bent plate retained between the same, said rings and plate being expansible, as described.

5. The combination of a stove-pipe, a bent corrugated plate surrounding the stove-pipe, and an expansible ring surrounding the plate, substantially as set forth.

6. The combination of a stove-pipe, a bent corrugated plate surrounding the stove-pipe, and a ring surrounding the plate and formed with a tapering flange, 9, to guide the thimble into the space surrounding the stove-pipe, substantially as set forth.

7. In combination with a stove-pipe, a corrugated plate bent to form a ring, as described, and a pair of coaxial rings, between which said corrugated ring is placed, having notched flanges, for the purpose set forth.

JOHN SCHEUERMANN.

Witnesses:
H. H. CAMPBELL,
PETER HALLIDAY.